United States Patent
Zhang et al.

(10) Patent No.: US 11,900,918 B2
(45) Date of Patent: Feb. 13, 2024

(54) METHOD FOR TRAINING A LINGUISTIC MODEL AND ELECTRONIC DEVICE

(71) Applicant: BEIJING BAIDU NETCOM SCIENCE TECHNOLOGY CO., LTD., Beijing (CN)

(72) Inventors: Liao Zhang, Beijing (CN); Zhengxiang Jiang, Beijing (CN); Xiaoyin Fu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 346 days.

(21) Appl. No.: 17/451,380

(22) Filed: Oct. 19, 2021

(65) Prior Publication Data
US 2022/0036880 A1    Feb. 3, 2022

(30) Foreign Application Priority Data
Oct. 27, 2020    (CN) .......................... 202011165544.5

(51) Int. Cl.
G10L 15/06    (2013.01)
G06F 40/253    (2020.01)
G06F 40/30    (2020.01)

(52) U.S. Cl.
CPC .......... *G10L 15/063* (2013.01); *G06F 40/253* (2020.01); *G06F 40/30* (2020.01)

(58) Field of Classification Search
CPC ..... G10L 15/063; G10L 15/19; G10L 15/183; G10L 15/1815; G10L 2015/0635;
(Continued)

(56) References Cited

U.S. PATENT DOCUMENTS 7,792,846 B1   9/2010 Raffill et al.
9,336,772 B1   5/2016 Salvador et al.
(Continued)

FOREIGN PATENT DOCUMENTS

CN    105074816 A    11/2015
CN    105161095 A    12/2015
(Continued)

OTHER PUBLICATIONS

Office Action issued in Chinese Application No. 202011165544.5, dated Jun. 5, 2023 (21 pages).
(Continued)

*Primary Examiner* — Yogeshkumar Patel
(74) *Attorney, Agent, or Firm* — Osha Bergman Watanabe & Burton LLP

(57) ABSTRACT

The present disclosure provides a method for training a linguistic model, related to fields of speech, natural language processing, deep learning technologies. A method includes: obtaining grammars corresponding to a plurality of sample texts and a slot value of a slot in each grammar by using semantic analysis; generating a grammar graph corresponding to each grammar based on the corresponding grammar and the slot value of the slot in the corresponding grammar; obtaining a weight of each grammar, a weight of each slot, and a weight of each slot value in each grammar graph based on the sample texts; determining at least one grammar frequency of each order based on the weight of each grammar, the weight of each slot, and the weight of each slot value in each grammar graph; and training the linguistic model based on the at least one grammar frequency of each order.

20 Claims, 5 Drawing Sheets

(58) Field of Classification Search
CPC ...... G06F 40/253; G06F 40/30; G06F 7/5443; G06F 40/211; G06F 40/268; G06F 40/40
See application file for complete search history.

(56) References Cited

U.S. PATENT DOCUMENTS

| | | | |
|---|---|---|---|
| 9,911,413 B1* | 3/2018 | Kumar | G06F 40/30 |
| 10,170,107 B1* | 1/2019 | Dreyer | G06F 40/30 |
| 2001/0029453 A1 | 10/2001 | Klakow et al. | |
| 2002/0128821 A1 | 9/2002 | Ehsani et al. | |
| 2015/0073798 A1 | 3/2015 | Karov et al. | |
| 2015/0279360 A1 | 10/2015 | Mengibar et al. | |
| 2015/0332672 A1 | 11/2015 | Akbacak et al. | |
| 2016/0371250 A1 | 12/2016 | Rhodes | |
| 2017/0193291 A1 | 7/2017 | Lucchese | |
| 2017/0293607 A1* | 10/2017 | Kolotienko | G06F 40/226 |
| 2017/0293687 A1* | 10/2017 | Kolotienko | G06F 40/30 |
| 2021/0390257 A1* | 12/2021 | Pang | G06F 40/30 |

FOREIGN PATENT DOCUMENTS

| | | | | |
|---|---|---|---|---|
| CN | 111475658 A | | 7/2020 | |
| CN | 111680129 A | * | 9/2020 | ......... G06F 16/3344 |
| EP | 1320086 A1 | | 6/2003 | |
| JP | 2002-268676 A | | 9/2002 | |
| JP | 2004-334193 A | | 11/2004 | |
| JP | 2014002257 A | | 1/2014 | |
| WO | 2008-118905 A2 | | 10/2008 | |

OTHER PUBLICATIONS

Office Action issued in Japanese Application No. 2021-174059, dated Aug. 23, 2022 (4 pages).

* cited by examiner

METHOD FOR TRAINING A LINGUISTIC MODEL AND ELECTRONIC DEVICE

FIELD

The present disclosure relates to fields of speech, natural language processing, deep learning technologies in the computer technology field, and more particularly to a method for training a linguistic model, an electronic device, and a storage medium.

BACKGROUND

At present, speech recognition technology has been widely used in the fields of smart home appliances, robots, and vehicle-mounted terminals. In the related art, speech recognition is generally performed based on a pre-trained linguistic model. In order to improve the performance of the linguistic model, a large amount of corpus data is often required for linguistic model training. When the amount of corpus data is too much, model training requires a lot of storage resources and computing resources.

SUMMARY

According to a first aspect of the present disclosure, a method for training a linguistic model is provided. The method includes: obtaining grammars corresponding to a plurality of sample texts and a slot value of a slot in each grammar by using semantic analysis; generating a grammar graph corresponding to each grammar based on the corresponding grammar and the slot value of the slot in the corresponding grammar; obtaining a weight of each grammar, a weight of each slot, and a weight of each slot value in each grammar graph based on the sample texts; determining at least one grammar frequency of each order based on the weight of each grammar, the weight of each slot, and the weight of each slot value in each grammar graph; and training the linguistic model based on the at least one grammar frequency of each order.

According to a second aspect of the present disclosure, an electronic device provided. The electronic device includes at least one processor; and a memory communicatively coupled with the at least one processor. The memory stores instructions executable by the at least one processor. When executed by the at least one processor, the instructions cause the at least one processor to perform the method for training a linguistic model according to the first aspect of the present disclosure.

According to a third aspect of the present disclosure, a non-transitory computer-readable storage medium having stored therein instructions. The instructions cause a computer to perform the method for training a linguistic model according to the first aspect of the present disclosure.

It should be understood that, content described in the Summary is not intended to identify key or important features of embodiments of the disclosure, nor is it intended to limit the scope of the disclosure. Other features of the disclosure will become apparent from the following description.

BRIEF DESCRIPTION OF THE DRAWINGS

The accompanying drawings are used for better understanding the solution and do not constitute a limitation of the disclosure.

DETAILED DESCRIPTION

The exemplary embodiments of the present disclosure are described below with reference to the accompanying drawings, which include various details of the embodiments of the present disclosure to facilitate understanding, and should be regarded as merely exemplary. Therefore, those skilled in the art should appreciate that various changes and modifications can be made to the embodiments described herein without departing from the scope and spirit of the present disclosure. Likewise, for clarity and conciseness, descriptions of well-known functions and structures are omitted in the following description.

A speech or a voice may include fields of voice recognition, voice interaction technologies, and is an important direction in the field of artificial intelligence.

The voice recognition is a technology that allows machines to convert speech signals into corresponding text or commands through a process of recognition and understanding. The voice recognition may include three aspects: feature extraction technology, pattern matching criteria and model training technology.

Voice interaction (VI) is a technology in which machines and users may perform interactions such as interactions, communication, and information exchange using voice as an information carrier. Compared with human-computer interaction in the related art, VI has advantages of convenience and high user comfort.

Natural language processing (NLP) is a science of studying computer systems that can effectively realize natural language communication, especially studying software systems in the computer systems. NLP is an important direction in the field of computer science and artificial intelligence.

Deep learning (DL) is a new research direction in the field of machine learning (ML). DL is a science of learning the internal laws and representation levels of sample data, so that machines can have the ability to analyze and learn like humans, which may recognize data such as text, images, sounds, etc. DL is widely used in speech and image recognition.

Figure 1:
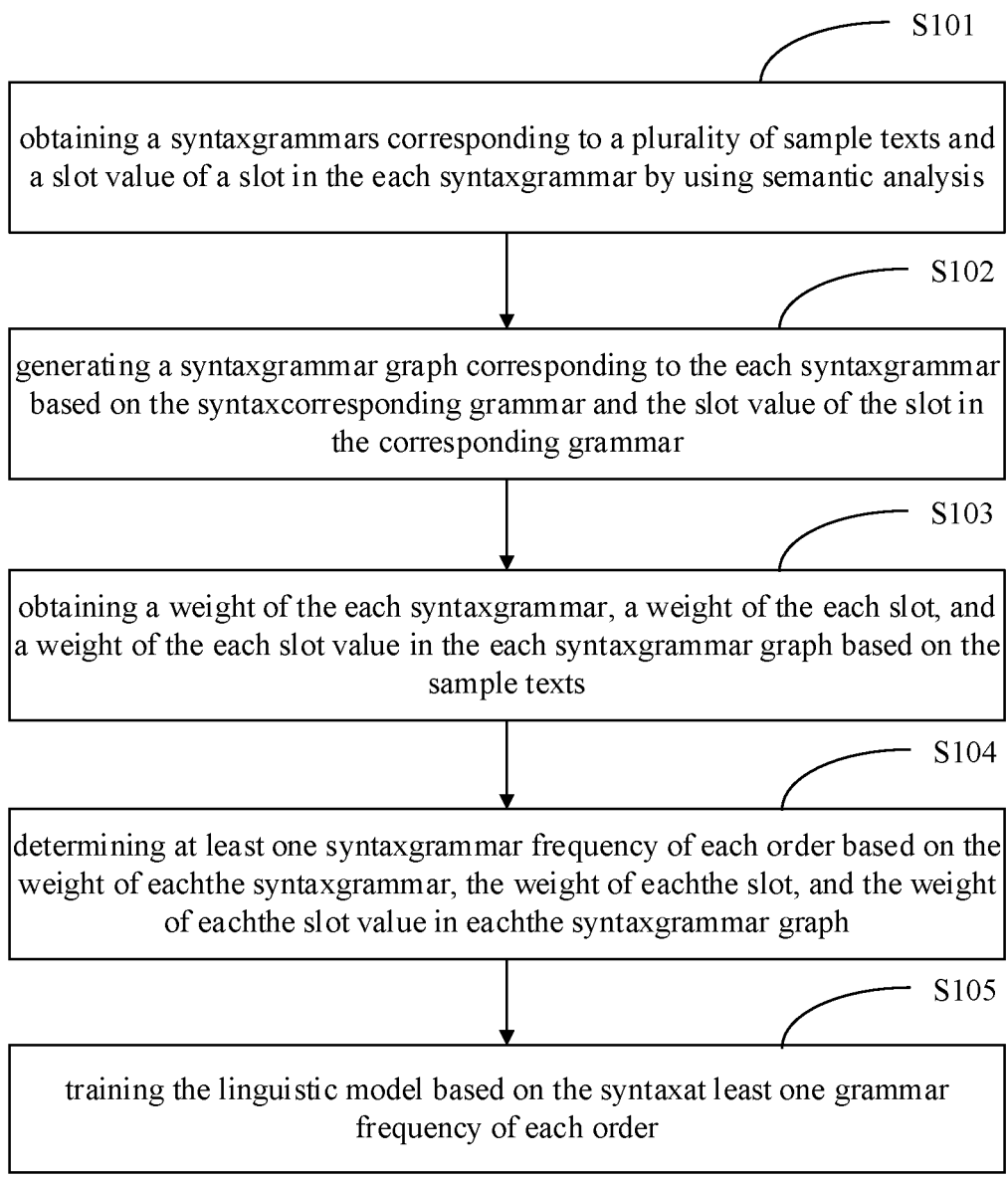
FIG. 1 is a flow chart of a method for training a linguistic model according to an embodiment of the present disclosure.

FIG. 1 is a flow chart of a method for training a linguistic model according to an embodiment of the present disclosure.

As illustrated in FIG. 1, the method for training a linguistic model according to an embodiment of the present disclosure includes the following.

At S101, grammars corresponding to a plurality of sample texts and a slot value of a slot in each grammar are obtained by using semantic analysis.

It is notable that, an execution subject of the method for training a linguistic model in the embodiment of the present disclosure may be a hardware device with data information processing capabilities and/or software for driving the hardware device to work. Optionally, the execution subject may include a workstation, a server, a computer, a user terminal and other equipment. The user terminal includes, but is not limited to, a mobile phone, a computer, a smart voice interactive device, a smart home appliance, and a vehicle-mounted terminal.

In some embodiments of the present disclosure, speech recognition can be performed through a pre-trained linguistic model, and the linguistic model may be obtained by training based on sample texts. Optionally, the linguistic model may be an N-gram model.

Optionally, the sample texts may be obtained through user input, network crawling, etc., which is not limited here.

It is understandable that, each sample text carries a corresponding grammar and slot value information corresponding to the slot in the grammar. The grammar refers to grammatical composition of a sample text, each grammar is composed of at least one slot, and each slot corresponds to at least one slot value.

It is understandable that, different sample texts may correspond to different grammars, slots, and slot values, thus multiple grammars and multiple slot values corresponding to slots in the respective grammars may be obtained based on multiple sample texts.

For example, a sample text 1 is "I want to listen to $A_1$ of $B_1$", in which $B_1$ is a name of a singer, $A_1$ is a name of a song. Thus, a grammar corresponding to the sample text 1 may be: "I want to listen to"+"song"+"of"+"singer". The grammar includes four slots, i.e., "I want to listen to", "song", "of", and "singer" in turn. A slot value corresponding to the slot "singer" in the grammar corresponding to the sample text 1 is $B_1$. A slot value corresponding to the slot "song" in the grammar corresponding to the sample text 1 is $A_1$.

Optionally, a sample text 2 is "I want to listen to $A_2$", in which $A_2$ is a name of a song. Thus, a grammar corresponding to the sample text 2 may be: "I want to listen to"+"song". The grammar includes two slots, i.e., "I want to listen to" and "song" in turn. A slot value corresponding to the slot "song" in the grammar corresponding to the sample text 2 is $A_2$.

Optionally, a sample text 3 is "how is the weather in Hangzhou tomorrow". Thus, a grammar corresponding to the sample text 3 may be "how is"+"weather"+"in"+"place"+"time". The grammar includes five slots, i.e., "how is", "weather", "in", "place", and "time" in turn. A slot value corresponding to the slot "time" in the grammar corresponding to the sample text 3 is tomorrow. A slot value corresponding to the slot "place" in the grammar corresponding to the sample text 3 is Hangzhou.

In an alternatively embodiment, the grammar may include a start slot and an end slot. The start slot is used to identify a start field of the grammar, and the end slot is used to identify an end field of the grammar. Both the start slot and the end slot may be represented in a way such as preset characters, strings. For example, the start slot may be "s", and the end slot may be "/s".

For example, a sample text 4 is "s I want to listen to $A_3$/s", in which $A_3$ is a name of a song, s is the preset start slot, and /s is a preset end slot. Thus, a grammar corresponding to the sample text 4 may be: "s"+"I want to listen to"+"song"+"/s". The grammar includes 4 slots, i.e., "s", "I want to listen to", "song", "/s" in turn. A slot value corresponding to the slot "song" in the grammar corresponding to the sample text 4 is $A_3$.

In some embodiments of the present disclosure, after the sample texts are obtained, a semantic analysis module may be used to extract the grammar and the slot value corresponding to the slot in the grammar from each sample text. For example, a semantic text of a sample text may be obtained through the semantic analysis module. And then, the grammar and at least one slot value corresponding to at least one slot in the grammar are extracted from the semantic text of the sample text. Further, the grammar and the slot value corresponding to the slot in the grammar extracted from the sample text by the semantic analysis module may be stored in a memory space of a server for acquisition during training the linguistic model.

It is understandable that, compared with obtaining the grammar and the slot value corresponding to the slot in the grammar through manual extraction in related art, the method in the present disclosure has the advantages of high acquisition efficiency, high degree of automation, and low labor cost.

In an alternatively embodiment, the semantic analysis module may be a natural language understanding (NLU) semantic analysis module.

At S102, a grammar graph corresponding to each grammar is generated based on the corresponding grammar and the slot value of the slot in the corresponding grammar.

It is understandable that, different grammars may correspond to different grammar graphs. The grammar graph corresponding to each grammar may be generated according to the at least one slot value corresponding to the at least one slot in the corresponding grammar.

Figure 2:
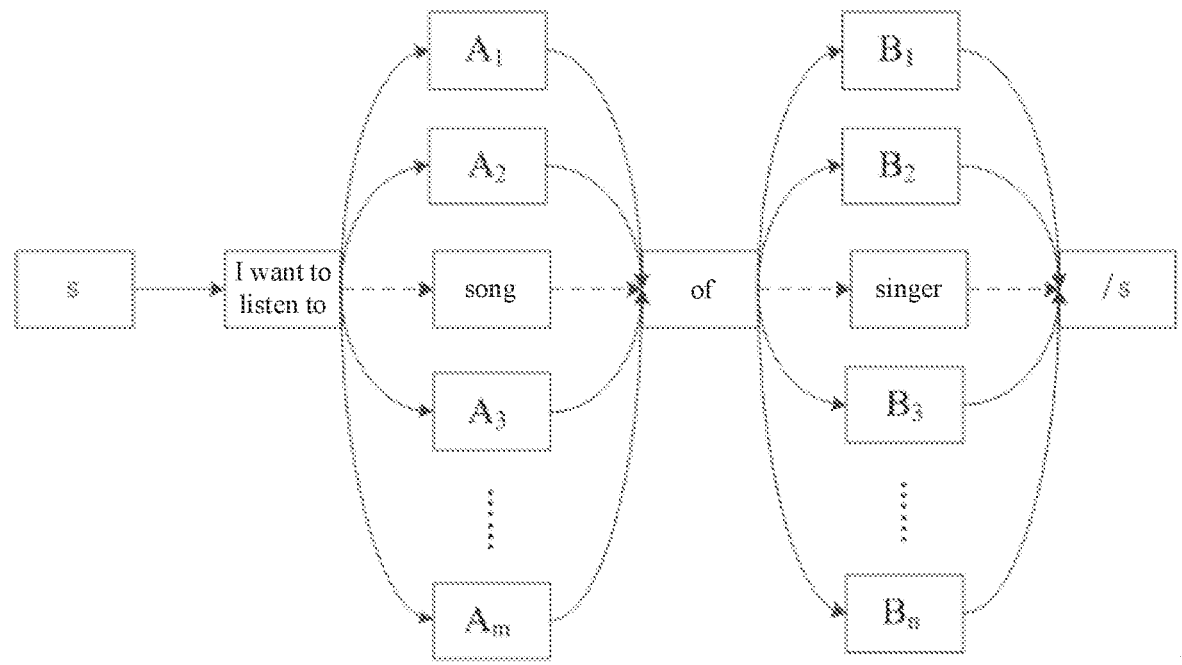
FIG. 2 is a schematic diagram illustrating a grammar graph in a method for training a linguistic model according to an embodiment of the present disclosure.

For example, the grammar is: "s"+"I want to listen to"+"song"+"of"+"singer"+"/s", in which, "s" is a preset start slot, and "/s" is a preset end slot. Slot values corresponding to the slot "song" include $A_1, A_2, A_3, \ldots, A_m$. Slot values corresponding to the slot "singer" include $B_1, B_2, B_3, \ldots, B_n$. Thus, a grammar graph corresponding to the grammar may be as shown in FIG. 2. Both the above m and n are positive integers, and may be set according to actual situation.

Figure 3:
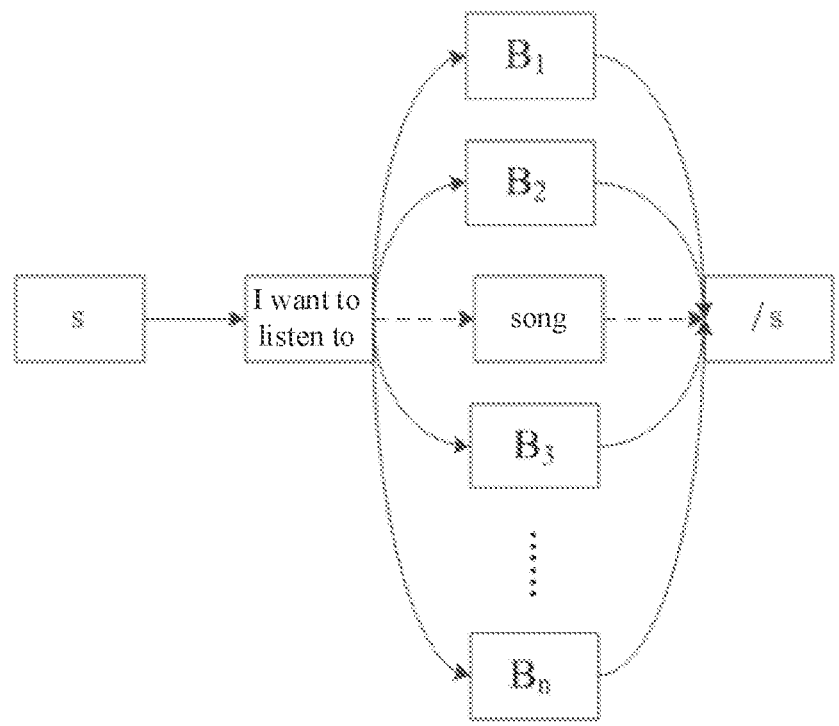
FIG. 3 is a schematic diagram illustrating a grammar graph in a method for training a linguistic model according to an embodiment of the present disclosure.

For example, the grammar is: "s"+"I want to listen to"+"song"+"/s", in which, "s" is a preset start slot, and "/s" is a preset end slot. Slot values corresponding to the slot "song" include $A_1, A_2, A_3, \ldots, A_m$. Thus, a grammar graph corresponding to the grammar may be as shown in FIG. 3. The above m is a positive integer, and may be set according to actual situation.

It is notable that, the grammar graph may also be other forms that are different from the forms shown in FIG. 2 and FIG. 3, which is not too limited here.

At S103, a weight of each grammar, a weight of each slot, and a weight of each slot value in each grammar graph are obtained based on the sample texts.

In some embodiments of the present disclosure, each grammar, each slot, and each slot value corresponds to a weight respectively. The weights may be used to calculate a grammar frequency, also called as a grammar count.

It is understandable that, the weight of each grammar, the weight of each slot, and the weight of each slot value in each grammar graph may be obtained according to the sample texts.

For example, when obtaining a weight of a grammar in a grammar graph based on the sample texts, the weight of the grammar may be positively correlated with a frequency of the grammar in all sample texts. That is, the higher the frequency of the grammar in all sample texts, the greater the weight of the grammar. Thus, the weight of the grammar in the grammar graph may be obtained according to the frequency of the grammar in all sample texts.

It is understandable that, if a grammar appears more frequently in all sample texts, it indicates that the grammar is more consistent with user's language habits and/or interaction requirements. With this method, by taking into account the frequency of the grammar in all sample texts when the weight of the grammar is obtained, the weight of the grammar may reflect the degree of conformity between the grammar and the user's language habits and/or interaction requirements, which is more flexible and accurate.

It is understandable that, the related content of obtaining a weight of a slot and a weight of a slot value in a grammar graph according to the sample texts may refer to the related content of obtaining the weight of the grammar in the grammar graph according to the sample texts, which will not be repeated here.

At S104, at least one grammar frequency of each order is determined based on the weight of each grammar, the weight of each slot, and the weight of each slot value in each grammar graph.

In some embodiments of the present disclosure, the order of the grammar frequency is related to the number of slots included in a grammar. For example, if a grammar includes N slots, the grammar may correspond to grammar frequencies of orders 1, 2, 3, . . . , N.

In an alternative embodiment, calculating the grammar frequencies of different orders according to the weight of each grammar, the weight of each slot and the weight of each slot value in each grammar graph may include the following. Calculation strategies are preset for the grammar frequencies of different orders, and the grammar frequencies of different orders are calculated according to the calculation strategies of the grammar frequencies of different levels. It should be noted that the calculation strategy may be set according to actual conditions and may be preset in a memory space of a server.

For example, there is only one grammar, and a weight of the grammar is 1. The grammar includes 6 slots, and each slot has one slot value. A weight of each slot in the grammar is equal to a weight of its slot value. For example, the weights corresponding to the 6 slots are $w_1$, $w_2$, $w_3$, respectively, then the first-order grammar frequency may include 6 values, and the calculation strategies of the 6 values may be $w_2*w_3*w_4*w_5*w_6$, $w_1*w_3*w_4*w_5*w_6$, $w_1*w_2*w_4*w_5*w_6$, $w_1*w_2*w_3*w_5*w_6$, $w_1*w_2*w_3*w_4*w_6$, $w_1*w_2*w_3*w_4*w_5$ respectively, the second-order grammar frequency may include 5 values, and the calculation strategies of the 5 values may be $w_3*w_4*w_5*w_6$、$w_1*w_4*w_5*w_6$、$w_1*w_2*w_5*w_6$、$w_1*w_2*w_3*w_6$、$w_1*w_2*w_3*w_4$ respectively. Calculation strategies of grammar frequencies of other orders may set with reference to the calculation strategies of the first-order grammar frequency and the second-order grammar frequency, which is not elaborated here.

At S105, the linguistic model is trained based on the at least one grammar frequency of each order.

In some embodiments of the present disclosure, after the grammar frequencies of different orders are obtained, linguistic model training may be performed according to the grammar frequencies of different orders.

It is understandable that, in the present disclosure, the grammar frequencies of different orders may be calculated directly according to the weights of the grammars, the weights of the slots, and the weights of the slot values in the grammar graphs. The efficiency of calculating the grammar frequency is higher, which can significantly shorten the time of training the linguistic model, and the performance of the linguistic model is also improved.

In conclusion, with the method for training a linguistic model according to the embodiments of the present disclosure, the grammar frequencies of different orders may be calculated directly according to the weights of the grammars, the weights of the slots and the weights of the slot values in the grammar graphs. Compared the solution of obtaining corpus by expanding the sample text and obtaining the grammar frequency by counting the corpus in the related art, with the method according to the present disclosure, the grammar frequency may be obtained without corpus expansion, which solves the problem of excessive corpus in related art, the efficiency of calculating the grammar frequency is high, the storage resources and computing resources consumed in the model training process may be significantly reduced, the training time of the linguistic model may also be significantly shortened, and the performance of the linguistic model is also improved.

Figure 4:
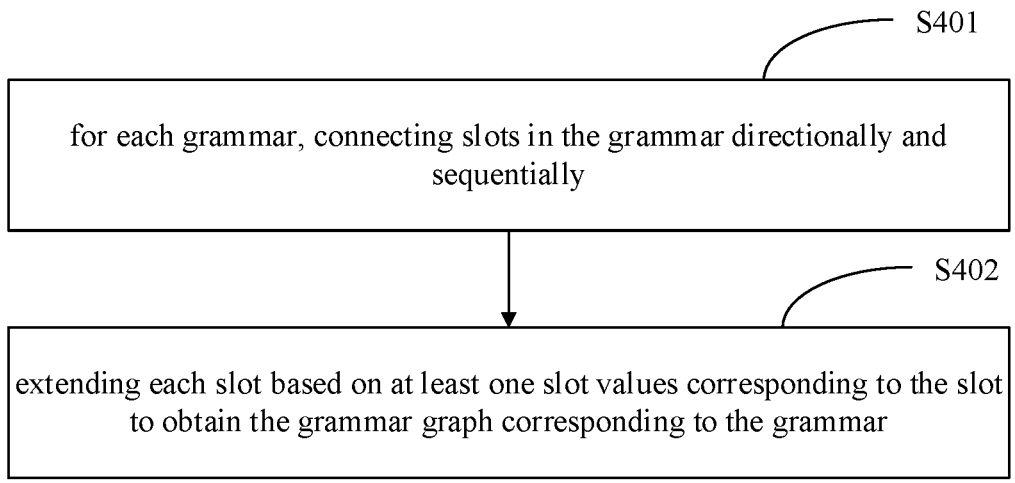
FIG. 4 is a flow chart of generating a grammar graph corresponding to a grammar based on the grammar and a slot value corresponding to a slot in the grammar graph in a method for training a linguistic model according to an embodiment of the present disclosure.

On the basis of any of the above embodiments, as illustrated in FIG. 4, generating the grammar graph corresponding to the grammar based on the corresponding grammar and the slot value of the slot in the corresponding grammar at S102 may include the following.

At S401, for each grammar, slots in the grammar are connected directionally and sequentially.

It is understandable that, the slots in the grammar have a sequence. Thus, the slots in the grammar may be directionally connected in sequence according to the sequence of the slots in the grammar. Optionally, adjacent slots in the grammar may be connected, with a connection direction from a current slot to the next slot in the adjacent slots.

Continuing to take FIG. 2 as an example, the grammar is "s"+"I want to listen to"+"song"+"of"+"singer"+"/s". The grammar includes 6 slots, i.e., "s", "I want to listen to", "song", "of", "singer", "/s" in order, where "s" is a preset start slot, and "/s" is a preset end slot. When generating the grammar graph corresponding to the grammar, the slot "s" may be connected to the slot "I want to listen to", and the connection direction is from the slot "s" to the slot "I want to listen to". Further, the slot "I want to listen to" may be connected to the slot "song", and the connection direction is from the slot "I want to listen to" to the slot "song". For the directed connection of other slots, reference may be made to the above connection method, which will not be repeated here.

Optionally, the grammar graph may be a directed acyclic graph (DAG), and the slots in the grammar may be directionally connected in sequence according to the connection rules of the directed acyclic graph.

At S402, each slot is extended based on at least one slot value corresponding to the slot to obtain the grammar graph corresponding to the grammar.

It is understandable that, each slot may correspond to multiple slot values, and the slot may be extended according to the corresponding slot values to generate a grammar graph corresponding to the grammar.

Continuing to take FIG. 2 as an example, slot values corresponding to the slot "song" include $A_1, A_2, A_3, \ldots, A_m$, and the slot values corresponding to the slot "singer" include $B_1, B_2, B_3, \ldots, B_n$, then the slot values $A_1, A_2, A_3, \ldots, A_m$ corresponding to the slot "song" are respectively connected to the slot "I want to listen to" and the slot "of" directionally to extend the slot "song", and the slot values $B_1, B_2, B_3, \ldots, B_n$ corresponding of the slot "singer" are respectively connected with the slot "of" and the slot "/s" to expand the "singer" slot. The generated grammar graph may be as shown in FIG. 2.

Thus, with this method, the slots in the grammar are sequentially connected though a directional connection, and the slots are extended according to the slot value corresponding to each slot to obtain the grammar graph corresponding to the grammar.

Figure 5:
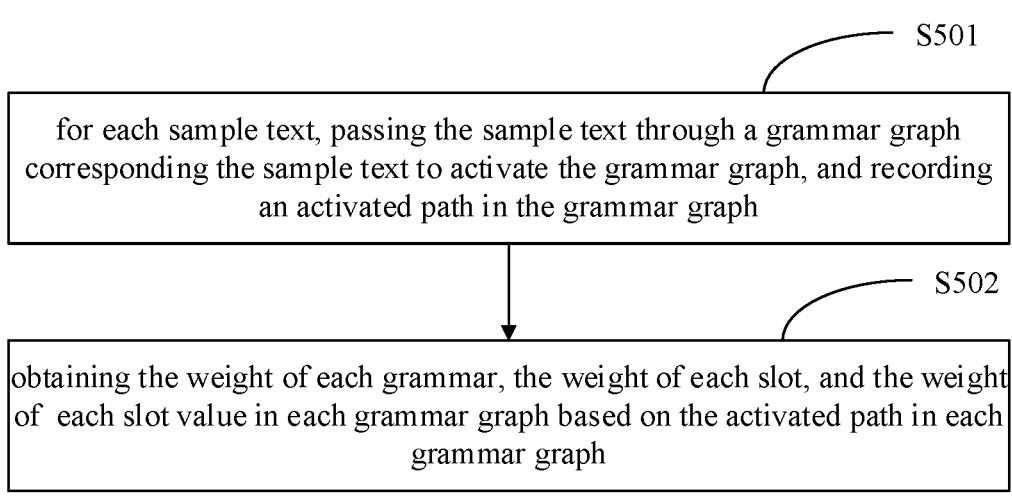
FIG. 5 is a flow chart of obtaining a weight of a grammar, a weight of a slot, and a weight of a slot value in a grammar graph based on a sample text in a method for training a linguistic model according to an embodiment of the present disclosure.
Figure 6:
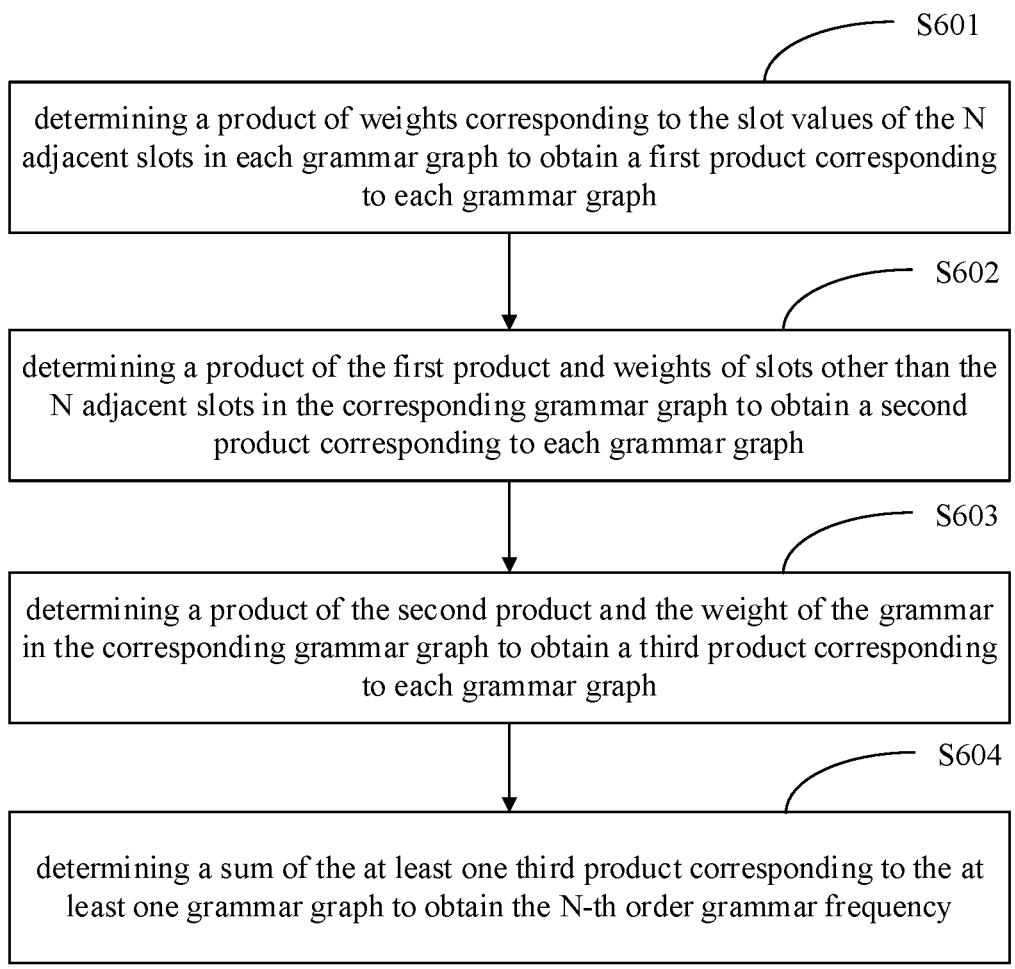
FIG. 6 is a flow chart of obtaining grammar frequencies of N orders in a method for training a linguistic model according to an embodiment of the present disclosure.

On the basis of any of the above embodiments, as illustrated in FIG. 5, obtaining the weight of each grammar, the weight of each slot, and the weight of each slot value in each grammar graph based on the sample texts at S103 may include the following.

At S501, for each sample text, the sample text is passed through a grammar graph corresponding the sample text to activate the grammar graph, and an activated path in the grammar graph is recorded.

It is understandable that, the grammar graph may include multiple paths, each path is composed of at least one slot, and each slot on each path corresponds to a slot value. Optionally, when the sample text is passed through the grammar graph, if a certain path in the grammar graph exists in the sample text, the path is activated, and the activated path in the grammar graph may be recorded.

Continuing to take FIG. 2 as an example, the grammar graph may include a path 1 composed of "I want to listen to"+"$A_1$"+"of"+"$B_2$". The path 1 includes 4 slots, i.e., "I want to listen to", "song", "of", and "singer" respectively. A slot value corresponding to the slot "song" is $A_1$. A slot value corresponding to the slot "singer" is $B_2$. If a simple text 5 is "I want to listen to $A_1$ of $B_2$", when the sample text 5 is input into the grammar graph shown in FIG. 2, the path 1 "I want to listen to"+"$A_1$"+"of"+"$B_2$" in the grammar graph is activated.

At S502, the weight of each grammar, the weight of each slot, and the weight of each slot value in each grammar graph are obtained based on the activated path in each grammar graph.

Taking obtaining the weight of a grammar in a grammar graph based on an activated path in the grammar graph as an example, the weight of the grammar may be positively correlated with the total number of activations of all paths in the grammar graph, that is, the greater the total number of activated paths in the grammar graph, the greater the weight of the grammar is. Thus, the weight of the grammar in the grammar graph may be obtained according to the total number of activations of all paths in the grammar graph.

It is understandable that, if the total number of activations of all paths in a certain grammar graph is larger, it indicates that the grammar is more consistent with the user's language habits and/or interaction needs. On the contrary, if the total number of activations of all paths in a certain grammar graph is smaller, it is more likely that the grammar is ungrammatical. In this method, if the grammar matches the user's language habits and/or interaction requirements, the weight of the grammar is great. If the grammar is ungrammatical, the weight of the grammar is low, so that the weight of the grammar is able to reflect the degree of conformity between the grammar and the user's language habits and/or interaction requirements, which is more flexible and accurate, and has the effect of noise suppression.

It is understandable that, the related content of obtaining a weight of a slot in a grammar graph and a weight of a slot value according to the activated path in the grammar graph may refer to the related content of obtaining the weight of the grammar in the grammar graph according to the activated path in the grammar graph, which is not elaborated here.

Optionally, when generating the grammar graph corresponding to the grammar, the weight of the grammar, the weight of the slot, and the weight of the slot value in the grammar graph may be initialized first, and then the step of passing the sample texts through the grammar graph and the subsequent steps are performed. For example, initializing the weight of the grammar, the weight of the slot and the weight of the slot value in the grammar graph may include assigning the weight of the grammar, the weight of the slot and the weight of the slot value in the grammar graph to 1.

With this method, each sample text may be passing through the grammar graph, the activated paths in the grammar graph are recorded, and the weight of the grammar, the weight of the slot, and the weight of the slot value in the grammar graph are obtained according to the activated paths in the grammar graph. Compared with the manual labeling method used in related technologies to obtain the weight of the grammar, the weight of the slot and the weight of the slot value, in this method, the weight can be automatically updated according to the sample text, and the weight is closer to the user's language habits and/or actual demand, with the advantages of high acquisition efficiency, high degree of automation, and low labor cost.

On the basis of any of the above embodiments, determining the at least one grammar frequency of each order based on the weight of each grammar, the weight of each slot, and the weight of each slot value in each grammar graph at S104 may include the following. Based on the weight of the grammar, the weight of the slot, and the weight of the slot value in at least one grammar graph, a grammar frequency is determined when slot values of N adjacent slots are fixed, thus an N-th-order grammar frequency is obtained, N being a positive integer.

That a slot value of a slot is fixed means that the slot value of the slot is not empty and is a unique value.

Continuing to take FIG. 2 as an example, the slot "I want to listen to" and the slot "song" are two adjacent slots. A slot value of the slot "I want to listen to" is fixed to "I want to listen to", a slot value of the slot "song" is fixed to "$A_1$", and slot values of other slots, i.e., slots different from the slot "I want to listen to" and the slot "song" in FIG. 2, are not fixed. Then a second-order grammar frequency may be determined based on the weight of the grammar, the weights of the slots, and the weights of the slot values in the grammar graph when the slot "I want to listen to" and the slot "song" are fixed.

Thus, with this method, the grammar frequency may be determined according to the weight of the grammar, the weights of the slots, and the weights of the slot values in at least one grammar graph when the slot values of the adjacent N slots is fixed, to obtain the N-th-order grammar frequency.

On the basis of any of the above embodiments, determining the grammar frequency based on the weight of the grammar, the weight of the slot, and the weighs of the slot value in the at least one grammar graph when the slot values of the N adjacent slots are fixed to obtain the N-th-order grammar frequency may include the following.

At S601, a product of weights corresponding to the slot values of the N adjacent slots in each of the at least one grammar graph is determined to obtain a first product corresponding to each grammar graph.

At S602, a product of the first product and weights of slots other than the N adjacent slots in the corresponding grammar graph is determined to obtain a second product corresponding to each grammar graph.

At S603, a product of the second product and the weight of the grammar in the corresponding grammar graph is determined to obtain a third product corresponding to each grammar graph.

At S604, a sum of the at least one third product corresponding to the at least one grammar graph is determined to obtain the N-th-order grammar frequency.

FIG. 2 and FIG. 3 are taken as examples.

In FIG. 2, the weight of the grammar shown in FIG. 2 is 200. Weights corresponding to the slots "s", "I want to listen to", "song", "of", "singer", and "/s" are 1, 1, 3, 1, 30, and 1 respectively. The weights corresponding to the slot values B1 and B2 of the slot "singer" are 20 and 10 respectively. The weights corresponding to the slot values A1 and A2 of the slot "song" are 2 and 1 respectively.

In FIG. 3, the weight of the grammar shown in FIG. 3 is 1000. Weights corresponding to the slots "s", "I want to listen to", "song", and "/s" are 1, 1, 3, and 1 respectively. The weights corresponding to the slot values A1 and A2 of the slot "song" are 2 and 1 respectively.

A calculation process of the N-th order grammar frequency will be described in the three cases below.

The first case:

When a slot value of the slot "s" is fixed as "s", and the slots value of other slots (the slots other than the slot "s" in FIG. 2 and FIG. 3) are not fixed, a first order grammar frequency $P_1$ may be calculated when the slot value of the slot "s" is fixed. A process of calculating the first order grammar frequency $P_1$ may be as follows.

In the grammar graph shown in FIG. 2, the first product $P_{11}$ is the weight 1 of the slot "s", the second product $P_{12}=1*1*3*1*30*1=90$, and the third product $P_{13}=P_{12}*200=90*200=18000$.

In the grammar graph shown in FIG. 3, the first product $P_{11}'$ is the weight 1 of the slot "s", the second product $P_{12}'=1*1*3*1=3$, and the third product $P_{13}'=P_{12}'*1000=3*1000=3000$.

Thus, the first order grammar frequency $P_1=P_{13}+P_{13}'=18000+3000=21000$ when the slot value of the slot "s" is fixed.

The second case:

When a slot value of the slot "singer" is fixed as "$B_1$", and the slots value of other slots (the slots other than the slot "singer" in FIG. 2 and FIG. 3) are not fixed, a first order grammar frequency $P_2$ may be calculated when the slot value of the slot "singer" is fixed as "$B_1$". A process of calculating the first order grammar frequency $P_2$ may be as follows.

In the grammar graph shown in FIG. 2, the first product $P_{21}$ is the weight 20 of the slot value $B_1$, the second product $P_{22}=20*1*1*3*1=60$, and the third product $P_{23}=P_{22}*200=60*200=12000$.

In the grammar graph shown in FIG. 3, there is no slot "singer", thus the slot value $B_1$ does not exist. Therefore, the third product $P_{23}'$ corresponding to FIG. 3 is 0.

Thus, the first order grammar frequency $P_2=P_{23}+P_{23}'=12000+0=12000$ when the slot value of the slot "singer" is fixed as "$B_1$".

The third case:

When a slot value of the slot "I want to listen to" is fixed as "I want to listen to", a slot value of the slot "song" is fixed as "$A_1$", and the slots value of other slots (the slots other than the slot "I want to listen to" and the slot "song" in FIG. 2 and FIG. 3) are not fixed, a second order grammar frequency $P_3$ may be calculated when the slot value of the slot "singer" is fixed as "I want to listen to" is fixed as "I want to listen to" and the slot value of the slot "song" is fixed as "$A_1$". A process of calculating the first order grammar frequency $P_3$ may be as follows.

In the grammar graph shown in FIG. 2, the first product $P_{31}=1*2=2$, the second product $P_{32}=2*1*30*1*1=60$, and the third product $P_{33}=P_{32}*200=60*200=12000$.

In the grammar graph shown in FIG. 3, the first product $P_{31}'=1*2=2$, the second product $P_{32}'=2*1*1=2$, and the third product $P_{33}'=P_{32}'*1000=2*1000=2000$.

Thus, the second order grammar frequency $P_3=P_{33}+P_{33}'=12000+2000=14000$ when the slot values of the slot "singer" and the slot "song" are fixed.

The calculation process of other N-th order grammar frequencies may refer to the above-mentioned embodiments, which will not be repeated here.

Thus, with this method, the first product, the second product, and the third product corresponding to each grammar graph may be calculated according to the weight of each grammar, the weight of each slot, and the weight of each slot value in the corresponding grammar graph. And then the sum of the third products corresponding to different grammar graphs is calculated to obtain the N-th order grammar frequency.

On the basis of any of the above embodiments, training the linguistic model based on the at least one grammar frequency of each order at S105 may include the following. Frequency-reduction processing is performed on a grammar frequency greater than a preset frequency threshold. The linguistic model is trained based on the processed grammar frequency of each order.

It is understandable that, it is not conducive to the training of the linguistic model when the grammar frequency exceeds the preset frequency threshold too much. Thus, the frequency-reduction processing may be performed on the grammar frequency exceeding the preset frequency threshold. By training the linguistic model with the frequency-reduced grammar frequency, the training effect of the linguistic model is improved.

The frequency threshold may be set according to the actual situation, for example, it can be set to 300,000.

Optionally, performing the frequency-reduction processing on the grammar frequency exceeding the preset frequency threshold may include using a smoothing algorithm to perform the frequency-reduction processing on the grammar frequency exceeding the preset frequency threshold. The smoothing algorithm may include but is not limited to add-one smoothing algorithm, Goode-Turing estimation method, Katz smoothing method, etc., which are not limited here.

On the basis of any of the above embodiments, the linguistic model may be trained by using sample texts of multiple vertical categories separately to improve the recognition performance of the linguistic model on different vertical categories. The vertical category includes but is not limited to music, weather, news, maps, smart home, search, etc., which is not limited here.

Figure 7:
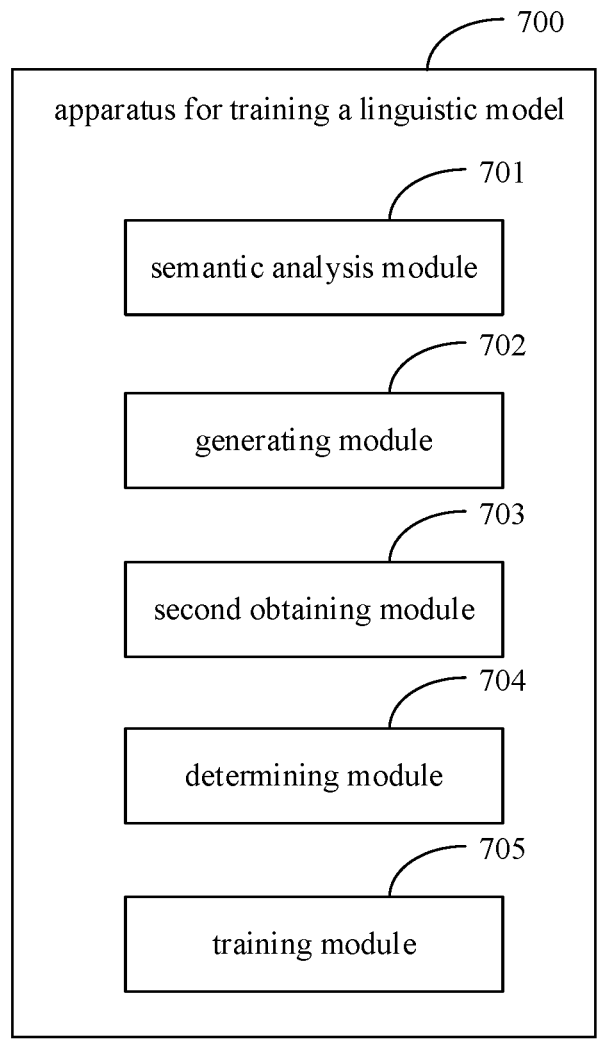
FIG. 7 is a block diagram of an apparatus for training a linguistic model according to an embodiment of the present disclosure.

FIG. 7 is a block diagram of an apparatus for training a linguistic model according to an embodiment of the present disclosure.

As illustrated in FIG. 7, the apparatus 700 for training a linguistic model according to an embodiment of the present disclosure includes a semantic analysis module 701, a generating module 702, a second obtaining module 703, a determining module 704, and a training module 705.

The semantic analysis module 701 is configured to obtain grammars corresponding to a plurality of sample texts and a slot value of a slot in each grammar.

The generating module 702 is configured to generate a grammar graph corresponding to each grammar based on the corresponding grammar and the slot value of the slot in the corresponding grammar.

The second obtaining module 703 is configured to obtain a weight of each grammar, a weight of each slot, and a weight of each slot value in each grammar graph based on the sample texts.

The determining module 704 is configured to determine at least one grammar frequency of each order based on the weight of each grammar, the weight of each slot, and the weight of each slot value in each grammar graph.

The training module 705 is configured to train the linguistic model based on the at least one grammar frequency of each order.

In an embodiment of the present disclosure, the semantic analysis module 701 is a natural language understanding semantic analysis module.

In an embodiment of the present disclosure, the second obtaining module 703 includes: an input unit, configured to, for each sample text, pass the sample text through a grammar graph corresponding the sample text to activate the grammar graph, and record an activated path in the grammar graph; and an obtaining unit, configured to obtain the weight of each grammar, the weight of each slot, and the weight of each slot value in each grammar graph based on the activated path in each grammar graph.

In an embodiment of the present disclosure, the generating module 702 includes: a connecting unit, configured to, for each grammar, connect slots in the grammar directionally and sequentially; and an extending unit, configured to extend each slot based on at least one slot value corresponding to the slot to obtain the grammar graph corresponding to the grammar.

In an embodiment of the present disclosure, the determining module 704 is further configured to determine, based on the weight of the grammar, the weight of the slot, and the weight of the slot value of the slot in at least one grammar graph, a grammar frequency when slot values of N adjacent slots are fixed to obtain an N-th-order grammar frequency, N being a positive integer.

In an embodiment of the present disclosure, the determining module 704 includes: a first determining unit, configured to determine a product of weights corresponding to the slot values of the N adjacent slots in each grammar graph to obtain a first product corresponding to each grammar graph; a second determining unit, configured to determine a product of the first product and weights of slots other than the N adjacent slots in the corresponding grammar graph to obtain a second product corresponding to each grammar graph; a third determining unit, configured to determine a product of the second product and the weight of the grammar in the corresponding grammar graph to obtain a third product corresponding to each grammar graph; and a fourth determining unit, configured to determine a sum of the at least one third product corresponding to the at least one grammar graph to obtain the N-th order grammar frequency.

In an embodiment of the present disclosure, the training module 705 includes: a frequency-reduction unit, configured to perform frequency-reduction processing on a grammar frequency greater than a preset frequency threshold; and a training unit, configured to train the linguistic model based on the processed grammar frequency of each order.

In conclusion, with the apparatus for training a linguistic model according to the embodiments of the present disclosure, the grammar frequencies of different orders may be calculated directly according to the weights of the grammars, the weights of the slots and the weights of the slot values in the grammar graphs. Compared the solution of obtaining corpus by expanding the sample text and obtaining the grammar frequency by counting the corpus in the related art, with the apparatus according to the present disclosure, the grammar frequency may be obtained without corpus expansion, which solves the problem of excessive corpus in related art, the efficiency of calculating the grammar frequency is high, the storage resources and computing resources consumed in the model training process may be significantly reduced, the training time of the linguistic model may also be significantly shortened, and the performance of the linguistic model is also improved.

According to embodiments of the present disclosure, the present disclosure further provides an electronic device and a readable storage medium.

Figure 8:
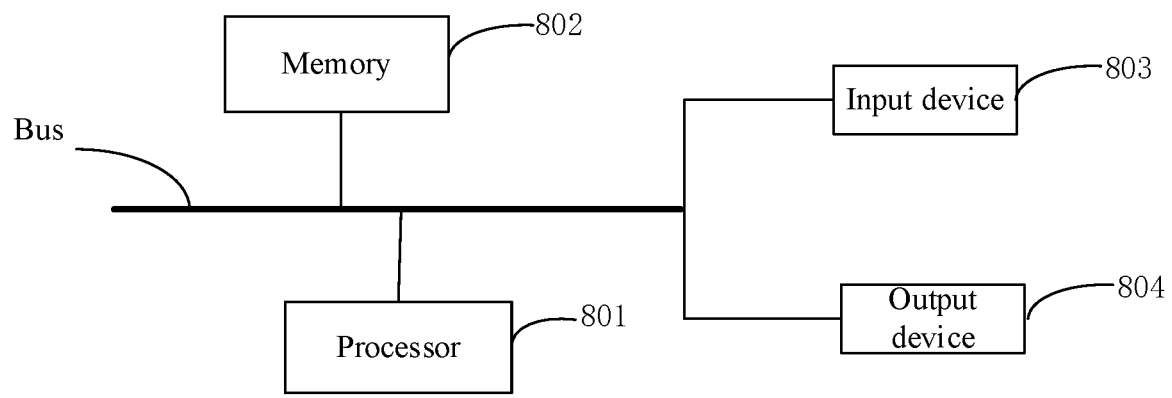
FIG. 8 is a block diagram of an electronic device for implementing a method for training a linguistic model according to an embodiment of the present disclosure.

FIG. 8 is a block diagram of an electronic device for implementing a method for training a linguistic model according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as intelligent voice interactive devices, personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 8, the electronic device includes: one or more processors 801, a memory 802, and interfaces for connecting various components, including a high-speed interface and a low-speed interface. The various components are interconnected using different buses and can be mounted on a common mainboard or otherwise installed as required. The processor 801 may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 801 is taken as an example in FIG. 8.

The memory 802 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 802 is configured to store non-transitory software programs, non-transitory computer executable programs and modules, such as program instructions/modules (for example, the semantic analysis module 701, the generating module 702, the second obtaining module 703, the determining module 704, and the training module 705 shown in FIG. 7) corresponding to the method in the embodiments of the disclosure. The processor 801 executes various functional applications and data processing of the electronic device by running non-transitory software programs, instructions, and modules stored in the memory 802, that is, implementing the method in the foregoing method embodiments.

The memory 802 may include a program storage area and a data storage area, where the program storage area may store an operating system and application programs required for at least one function. The data storage area may store data created according to the use of the electronic device for implementing the method. In addition, the memory 802 may include a high-speed random access memory, and a non-transitory memory, such as at least one magnetic disk storage device, a flash memory device, or other non-transitory solid-state storage device.

In some embodiments, the memory 802 may optionally include a memory remotely disposed with respect to the processor 801, and these remote memories may be connected to the electronic device for implementing the method through a network. Examples of the above network include, but are not limited to, the Internet, an intranet, a local area network, a mobile communication network, and combinations thereof.

The electronic device used to implement the method may further include: an input device 803 and an output device 804. The processor 801, the memory 802, the input device 803, and the output device 804 may be connected through a bus or in other manners. In FIG. 8, the connection through the bus is taken as an example.

The input device 803 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 804 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve defects such as difficult management and weak business scalability in the traditional physical host and Virtual Private Server (VPS) service.

With the technical solution according to the embodiments of the present disclosure, the grammar frequencies of different orders may be calculated directly according to the weights of the grammars, the weights of the slots and the weights of the slot values in the grammar graphs. Compared the solution of obtaining corpus by expanding the sample text and obtaining the grammar frequency by counting the corpus in the related art, with the technical solution according to the present disclosure, the grammar frequency may be obtained without corpus expansion, which solves the problem of excessive corpus in related art, the efficiency of calculating the grammar frequency is high, the storage resources and computing resources consumed in the model training process may be significantly reduced, the training time of the linguistic model may also be significantly shortened, and the performance of the linguistic model is also improved.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for training a linguistic model, comprising:
   obtaining grammars corresponding to a plurality of sample texts and a slot value of a slot in each grammar by using semantic analysis;
   generating a grammar graph corresponding to each grammar based on the corresponding grammar and the slot value of the slot in the corresponding grammar;
   obtaining a weight of each grammar, a weight of each slot, and a weight of each slot value in each grammar graph based on the sample texts;
   determining at least one grammar frequency of each order based on the weight of each grammar, the weight of each slot, and the weight of each slot value in each grammar graph; and
   training the linguistic model based on the at least one grammar frequency of each order.

2. The method according to claim 1, wherein the semantic analysis comprises natural language understanding semantic analysis.

3. The method according to claim 1, wherein obtaining the weight of each grammar, the weight of each slot, and the weight of each slot value in each grammar graph based on the sample texts comprises:
   for each sample text, passing the sample text through a grammar graph corresponding the sample text to activate the grammar graph, and recording an activated path in the grammar graph; and
   obtaining the weight of each grammar, the weight of each slot, and the weight of each slot value in each grammar graph based on the activated path in each grammar graph.

4. The method according to claim 1, wherein generating the grammar graph corresponding to each grammar based on the corresponding grammar and the slot value of the slot in the corresponding grammar comprises:
   for each grammar, connecting slots in the grammar directionally and sequentially; and
   extending each slot based on at least one slot value corresponding to the slot to obtain the grammar graph corresponding to the grammar.

5. The method according to claim 1, wherein determining the at least one grammar frequency of each order based on the weight of each grammar, the weight of each slot, and the weight of each slot value in each grammar graph comprises:
   determining, based on the weight of the grammar, the weight of the slot, and the weight of the slot value of the slot in at least one grammar graph, a grammar frequency when slot values of N adjacent slots are fixed to obtain an N-th-order grammar frequency, N being a positive integer.

6. The method according to claim 5, wherein determining the grammar frequency based on the weight of the grammar, the weight of the slot, and the weight of the slot value in the at least one grammar graph when the slot values of the N adjacent slots are fixed to obtain the N-th-order grammar frequency comprises:
   determining a product of weights corresponding to the slot values of the N adjacent slots in each grammar graph to obtain a first product corresponding to each grammar graph;
   determining a product of the first product and weights of slots other than the N adjacent slots in the corresponding grammar graph to obtain a second product corresponding to each grammar graph;
   determining a product of the second product and the weight of the grammar in the corresponding grammar graph to obtain a third product corresponding to each grammar graph; and
   determining a sum of the at least one third product corresponding to the at least one grammar graph to obtain the N-th order grammar frequency.

7. The method according to claim 1, wherein training the linguistic model based on the at least one grammar frequency of each order comprises:
   performing frequency-reduction processing on a grammar frequency greater than a preset frequency threshold; and
   training the linguistic model based on the processed grammar frequency of each order.

8. An electronic device, comprising:
   at least one processor; and
   a memory communicatively coupled with the at least one processor;
   wherein, the memory stores instructions executable by the at least one processor that, when executed by the at least one processor, cause the at least one processor to perform a method for training a linguistic model, the method comprising:
   obtaining grammars corresponding to a plurality of sample texts and a slot value of a slot in each grammar by using semantic analysis;
   generating a grammar graph corresponding to each grammar based on the corresponding grammar and the slot value of the slot in the corresponding grammar;
   obtaining a weight of each grammar, a weight of each slot, and a weight of each slot value in each grammar graph based on the sample texts;
   determining at least one grammar frequency of each order based on the weight of each grammar, the weight of each slot, and the weight of each slot value in each grammar graph; and
   training the linguistic model based on the at least one grammar frequency of each order.

9. The electronic device according to claim 8, wherein the semantic analysis comprises natural language understanding semantic analysis.

10. The electronic device according to claim 8, wherein obtaining the weight of each grammar, the weight of each slot, and the weight of each slot value in each grammar graph based on the sample texts comprises:

for each sample text, passing the sample text through a grammar graph corresponding the sample text to activate the grammar graph, and recording an activated path in the grammar graph; and obtaining the weight of each grammar, the weight of each slot, and the weight of each slot value in each grammar graph based on the activated path in each grammar graph.

11. The electronic device according to claim 8, wherein generating the grammar graph corresponding to each grammar based on the corresponding grammar and the slot value of the slot in the corresponding grammar comprises:

for each grammar, connecting slots in the grammar directionally and sequentially; and extending each slot based on at least one slot value corresponding to the slot to obtain the grammar graph corresponding to the grammar.

12. The electronic device according to claim 8, wherein determining the at least one grammar frequency of each order based on the weight of each grammar, the weight of each slot, and the weight of each slot value in each grammar graph comprises:

determining, based on the weight of the grammar, the weight of the slot, and the weight of the slot value of the slot in at least one grammar graph, a grammar frequency when slot values of N adjacent slots are fixed to obtain an N-th-order grammar frequency, N being a positive integer.

13. The electronic device according to claim 12, wherein determining the grammar frequency based on the weight of the grammar, the weight of the slot, and the weight of the slot value in the at least one grammar graph when the slot values of the N adjacent slots are fixed to obtain the N-th-order grammar frequency comprises:

determining a product of weights corresponding to the slot values of the N adjacent slots in each grammar graph to obtain a first product corresponding to each grammar graph;

determining a product of the first product and weights of slots other than the N adjacent slots in the corresponding grammar graph to obtain a second product corresponding to each grammar graph;

determining a product of the second product and the weight of the grammar in the corresponding grammar graph to obtain a third product corresponding to each grammar graph; and determining a sum of the at least one third product corresponding to the at least one grammar graph to obtain the N-th order grammar frequency.

14. The electronic device according to claim 8, wherein training the linguistic model based on the at least one grammar frequency of each order comprises:

performing frequency-reduction processing on a grammar frequency greater than a preset frequency threshold; and training the linguistic model based on the processed grammar frequency of each order.

15. A non-transitory computer-readable storage medium having stored therein instructions, wherein the instructions cause a computer to perform a method for training a linguistic model, the method comprising:

obtaining grammars corresponding to a plurality of sample texts and a slot value of a slot in each grammar by using semantic analysis;

generating a grammar graph corresponding to each grammar based on the corresponding grammar and the slot value of the slot in the corresponding grammar;

obtaining a weight of each grammar, a weight of each slot, and a weight of each slot value in each grammar graph based on the sample texts;

determining at least one grammar frequency of each order based on the weight of each grammar, the weight of each slot, and the weight of each slot value in each grammar graph; and training the linguistic model based on the at least one grammar frequency of each order.

16. The electronic device according to claim 15, wherein obtaining the weight of each grammar, the weight of each slot, and the weight of each slot value in each grammar graph based on the sample texts comprises:

for each sample text, passing the sample text through a grammar graph corresponding the sample text to activate the grammar graph, and recording an activated path in the grammar graph; and obtaining the weight of each grammar, the weight of each slot, and the weight of each slot value in each grammar graph based on the activated path in each grammar graph.

17. The electronic device according to claim 15, wherein generating the grammar graph corresponding to each grammar based on the corresponding grammar and the slot value of the slot in the corresponding grammar comprises:

for each grammar, connecting slots in the grammar directionally and sequentially; and extending each slot based on at least one slot value corresponding to the slot to obtain the grammar graph corresponding to the grammar.

18. The non-transitory computer-readable storage medium according to claim 15, wherein determining the at least one grammar frequency of each order based on the weight of each grammar, the weight of each slot, and the weight of each slot value in each grammar graph comprises:

determining, based on the weight of the grammar, the weight of the slot, and the weight of the slot value of the slot in at least one grammar graph, a grammar frequency when slot values of N adjacent slots are fixed to obtain an N-th-order grammar frequency, N being a positive integer.

19. The non-transitory computer-readable storage medium according to claim 18, wherein determining the grammar frequency based on the weight of the grammar, the weight of the slot, and the weight of the slot value in the at least one grammar graph when the slot values of the N adjacent slots are fixed to obtain the N-th-order grammar frequency comprises:

determining a product of weights corresponding to the slot values of the N adjacent slots in each grammar graph to obtain a first product corresponding to each grammar graph;

determining a product of the first product and weights of slots other than the N adjacent slots in the corresponding grammar graph to obtain a second product corresponding to each grammar graph;

determining a product of the second product and the weight of the grammar in the corresponding grammar graph to obtain a third product corresponding to each grammar graph; and determining a sum of the at least one third product corresponding to the at least one grammar graph to obtain the N-th order grammar frequency.

20. The non-transitory computer-readable storage medium according to claim 15, wherein training the linguistic model based on the at least one grammar frequency of each order comprises:

performing frequency-reduction processing on a grammar frequency greater than a preset frequency threshold; and training the linguistic model based on the processed grammar frequency of each order.

* * * * *